Nov. 30, 1926.                                           1,608,661
                       C. H. NORDELL
    METHOD OF AND APPARATUS FOR THE CONTINUOUS SOFTENING OF WATER
                       BY THE USE OF ZEOLITES
                       Filed July 25, 1921
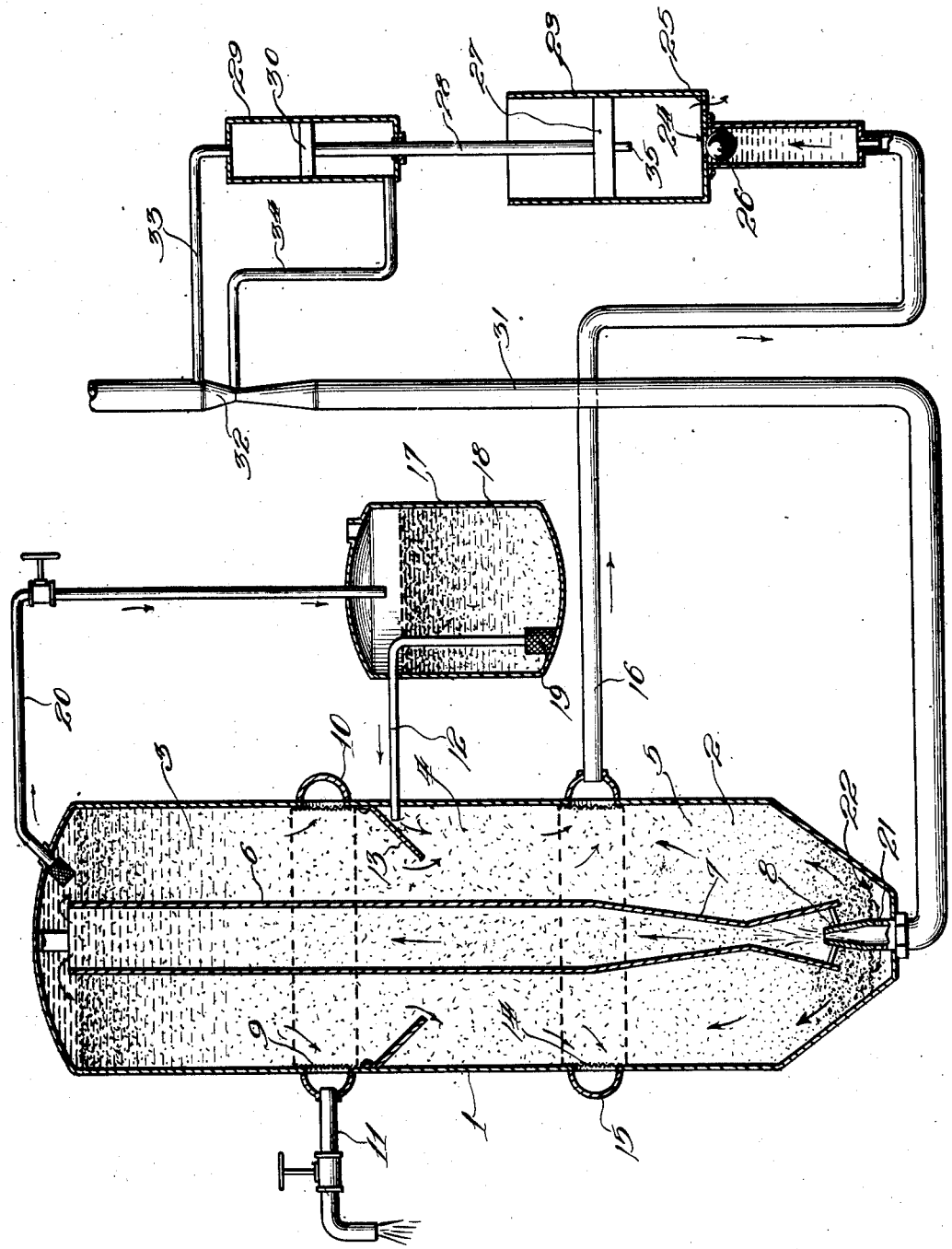
Witness:                                          Inventor:
                                                  Carl H. Nordell
                                              By Chamberlin Brendenreich
                                                              Attys.

Patented Nov. 30, 1926.

1,608,661

UNITED STATES PATENT OFFICE.

CARL H. NORDELL, OF PINE LAKE, INDIANA.

METHOD OF AND APPARATUS FOR THE CONTINUOUS SOFTENING OF WATER BY THE USE OF ZEOLITES.

Application filed July 25, 1921. Serial No. 487,465.

The word zeolites as used herein includes hydrated alumina silicates or any other material having base exchange properties. These base exchange silicates may be natural or synthetic.

All the types of water softening apparatus by the use of zeolites for the removal therefrom of one or more substances in solution therein, which have been heretofore used, filter the water to be softened through a bed of zeolites which rests upon a suitable screen support with or without an intervening supporting layer of gravel and sand. The liquid to be treated is passed through the bed either downwardly or upwardly as desired. In all such apparatuses after the zeolites have been used for some time, the length of time depending upon the proportion of hardening material being removed, the rapidity of flow, the depth of bed of zeolites used, any or all of them, the zeolites become practically exhausted, that is, their base exchanging action substantially ceases. It then becomes necessary to shut off the supply of hard water being treated, close the discharge outlet for treated liquid—in short, to take the apparatus out of service temporarily—and to then pass a regenerating solution through the filtering bed. After the zeolites have been regenerated by contact of the regenerating fluid therewith for a suitable time, the substantially spent regenerating fluid must be washed out before the apparatus is again ready for use.

The present invention has for its principal object a method of and means for continuously softening water by the use of zeolites, without shutting down the apparatus used, during reconditioning of the zeolites. By reconditioning is meant both the regeneration of the exhausted zeolites and the washing them free of the regenerating liquid and waste products of the reaction.

In carrying out my invention I arrange the zeolites in masses for successive water softening, regenerating and washing; the zeolites being moved and the liquid to be treated, the regenerating fluid and the washing fluid being so supplied as to provide continuous cycles of said steps automatically.

The zeolitic material must be reconditioned or regenerated in any event after its softening properties are substantially exhausted, whether the softening operation be continuous or intermittent; and therefore, viewed in one of its aspects, my invention may be said to have for its object to make it possible to recondition or regenerate the zeolitic material and wash the same while the water-softening process is going on.

The essential novelty of my invention is the maintenance at all times of a sufficient quantity of base exchange silicates in condition for effective treatment of the water being supplied to the apparatus for softening.

Viewed in another of its aspects, my invention may be regarded as having for its object to produce a novel and unique method of water softening in which the softening material, instead of remaining stationary, is circulated and recirculated.

In the particular embodiment of my invention selected for illustration, an apparatus which may be employed for automatically softening hard water by the use of zeolites is shown diagrammatically.

In this apparatus I arrange sodium zeolites in three masses, one in each zone; in the upper, the water softening process takes place, in the middle zone, the regeneration process takes place, in the lower zone, the washing process takes place; and the zeolites are passed in relatively small quantities from the upper zone to the middle zone, from the middle zone to the lower zone and from the bottom of the lower zone back to the top of the upper zone, the cycle being continuously repeated.

Referring to the drawing, 1 represents a tank almost wholly filled with granular zeolitic material, 2, preferably of the rapidly-acting type as, for example, the material described in United States Patent No. 1,348,977, the softening zone, the reconditioning or regenerative zone, and the washing zone being in this instance simply the upper portion, 3, the middle portion, 4, and the lower portion, 5, of the tank. The zeolitic material is pumped in any suitable way from the bottom of the tank into the top, the entire mass settling gradually during this process so that each particle will travel from the top of the tank to the bottom and will then be returned to the top again ready to start again on its downward journey.

In the arrangement shown, I utilize the energy in the incoming raw water to carry the zeolitic material upwardly in the tank, gravity and to some extent, at least, a differential fluid pressure causing the downward movement of the mass as a whole at a rate proportional to the rate at which the material is removed at the bottom. To this end there is placed at the vertical axis of the tank a tube, 6, open at the top and at the bottom and spaced apart at its ends from both the top and bottom of the tank; the upper end of the tube extending somewhat above the top of the bed of zeolitic material. The lower end of the tube has a Venturi section, 7, into which extends a nozzle, 8, for delivering raw water to be softened. As the water is discharged under pressure through the nozzle, a suction is created which causes the granular zeolitic material surrounding the lower end of the tube to be picked up and carried with the incoming water upwardly through the tube and to be delivered upon the top of the bed of material in the tank. As material is taken away from the bottom of the mass, the whole mass settles downwardly.

At the lower end of the softening zone, namely about one third of the way down from the top of the tank in the arrangement shown, is an outlet for softened water; this outlet being formed by making a short section, 9, of the tank in this plane in the form of a fine screen through which the zeolitic material will not pass, but which permits free passage for water. An annular housing, 10, surrounds the tank at the screened section, forming a chamber in which the softened water may collect; the water discharged out of the top of the central tube seeping down through the zeolitic material to this chamber. Water is withdrawn from the receiving chamber through a suitable service pipe, 11. It is necessary that the pressure in the softening zone 3 be greater than that in the adjacent reconditioning zone 4 in order to prevent a flow of brine from the latter zone into the former. It therefore follows that some of the softened water will pass down into the reconditioning zone instead of entering the receiver for softened water.

The rate at which the zeolitic material is circulated is such that the softening properties of any given quantity thereof will not have become exhausted, after having been deposited on top of the mass or bed, until it settles down to the level of the discharge outlet for softened water. Below such discharge outlet is the reconditioning zone 4 into which is introduced brine.

In the arrangement shown, the brine is delivered into the upper part of the reconditioning zone through a pipe, 12. In order to insure against a mingling of the brine and softened water at the point of entry of the brine, there may be placed in the tank a baffle plate, 13, in the form of an annulus whose external diameter is the same as the inner diameter of the tank and whose internal diameter is greater than the diameter of the tube 6. The baffle plate preferably inclines downwardly from the outer edge toward the center. When the softener is in operation, the brine, together with some of the softened water, flows down through the zeolitic material occupying the intermediate or reconditioning zone; until, as a spent liquid, it is discharged at the lower end of said zone. The outlet for the spent brine may conveniently be a screen band or belt, 14, in the tank, similar to the screened outlet, 9, for the softened water; a collecting chamber, 15, extending around the tank over the screen section, 14. From the collecting chamber the spent brine flows through a discharge pipe, 16, which may be provided with a suitable controlling valve.

The delivery of brine into the tank may be controlled in any suitable way. For example, there may be placed beside the softening tank a receptacle, 17, adapted to contain a body of salt, 18; the pipe 12 which delivers the brine to the tank extending into the receptacle and having a screened inlet end, 19, at the bottom of the receptacle; and there being a pipe, 20, leading from the top of the main tank into the top of the salt receptacle. The flow of brine into the main tank therefore depends upon the existence of a differential pressure between the upper end of the tank and the reconditioning zone and, as this differential pressure varies, the rate of flow of brine also varies. Therefore the flow of brine is automatically regulated.

After the zeolitic material has been reconditioned or regenerated in the second zone, it must be washed to remove the brine which remains in it. The washing operation is carried on in the third or lowermost zone. The washing water is obtained from the raw water supply, through the nozzle, 8, having at the base thereof several laterally-opening ports, 21, which discharge water laterally underneath a screen, 22, forming a false bottom for the tank and leaving a space in the extreme lower end of the tank in which there is no zeolitic material. The water discharged laterally through the ports, 21, rises through the screen, 22, and through the zeolitic material until it reaches a discharge outlet, the zeolitic material being washed by the rising water. The discharge outlet for the washing water may conveniently be the same as that for the spent brine, the upward moving washing water and the downward moving spent brine meeting at the level of the screened outlet, 14.

It is desirable in most instances to have means for automatically regulating the washing water as the flow and pressure of the water to be treated varies. In the arrangement shown, the waste pipe, 16, extends to a cylinder, 23, having an inlet opening, 24, and a discharge opening, 25, in the bottom. The inlet opening, 24, is controlled by a heavy ball valve, 26, seating upwardly. In the cylinder, 23, is a piston, 27, connected to a piston rod, 28, which extends into a second cylinder, 29, with an opening at both ends and smaller in diameter than the cylinder 23. In the cylinder, 29, and fixed to the piston rod, 28, is a piston 30. The supply pipe, 31, for the raw water, has therein a Venturi tube section, 32. From the inlet end of the Venturi tube, 32, to the upper end of the cylinder, 29, extends a pipe, 33; while from a point of reduced pressure in the Venturi tube to the lower end of the cylinder, 29, extends a second pipe, 34. When water is flowing, the pressure in the top of the cylinder, 29, is greater than that in the lower end and therefore the tendency is to force the piston, 30, and consequently the piston, 27, downwardly.

Assuming that the parts are in the positions illustrated in the drawing and that water is flowing through the system: the differential pressure on the piston, 30, will force the same and the piston, 27, down until a finger or pin 35 on the piston 27 strikes the ball 26 and pushes it down. Waste water then flows up through the inlet opening, 24, and because the inlet opening is larger than the discharge opening, 25, pressure is established in the cylinder 23 below the piston, and the piston is forced up. The ball valve 26 is of steel or other heavy material and, after being pushed out of the way, as heretofore explained, it may drop quite far below the port which it controls, so that it may not seat itself immediately upon the withdrawal of the finger or pin 35. Sooner or later, however, the ball 26 rises and closes the inlet port. As soon as the inlet port is closed, the upward pressure on the piston 27 ceases and therefore the differential downward pressure on the piston, 30, causes this piston and the piston 27 gradually to move down, forcing the water out of the cylinder 23 if it be not already flowing out faster than necessary to permit the free downward movement of the piston 27. The inlet valve will then be caused to be opened as heretofore explained and the cycle just described will be repeated. The discharge of wash water is therefore intermittent and automatically controlled. It will be seen that the brine as well as the wash water is controlled by the automatic controller.

While I have illustrated and described with particularity only a single apparatus by means of which my invention may be carried out, I do not desire to be limited to the details thus illustrated and described; but intend to cover all methods, forms and arrangements which come within the definition of my invention constituting the appended claims.

I do not limit myself to the apparatus herein illustrated and described, but conceive as within the scope of my invention, any method of softening water continuously by the use of zeolites and apparatus for carrying the same into effect that fall within the scope of the claims that may be ultimately allowed hereon.

Obviously water or other liquids may be treated in like manner and with like apparatus for the removal of other than hardening substances held in solution therein.

I claim:

1. A continuous water-softening method which consists in dividing a quantity of zeolitic material into three sections, causing a progressive transfer of material from one section to another in endless cycles, passing water to be softened through a portion of said material in one of said sections, regenerating a portion of said material while it is passing through another of said sections, and washing a portion of said material while it is passing downwardly through the third section.

2. A continuous water-softening method which consists in dividing a quantity of zeolitic material into three sections; in each of which the material is continually passing downwardly; simultaneously passing water to be softened through the first section, regenerating brine through the second section, and washing water through the third section, and withdrawing said brine and wash water; and causing the zeolitic material to be progressively transferred from the first section to the second section, from the second to the third, and from the third to the first, in endless cycles.

3. A water-softening apparatus comprising a tank partially filled with zeolitic material, means for withdrawing said material from the bottom of the tank and returning it to the top of the bed, means for passing water to be softened through the upper portion of the bed, means for passing washing water through the bottom portion of said bed, means for passing brine through the intermediate portion of the bed, and means for withdrawing used brine and wash water from the tank.

4. A continuous water-softening method which consists in dividing a quantity of zeolitic material into three sections, causing a progressive transfer of material from one section to another in endless cycles, passing water to be softened through one of said sections, regenerating the material while it is in another of said sections, intermittently washing the material while it remains in the third section, and withdrawing the used regenerating agent and wash water.

5. A method of softening water consisting of continuously bringing hard water into contact with zeolites, lowering a portion of the most spent of said zeolites, regenerating and washing them, withdrawing the regenerating agent and wash water, and returning the regenerated zeolites for use in again softening water; said cycle of events being maintained by gravity acting on the bed of zeolites and the kinetic energy of the upwardly flowing water to be softened acting on the regenerated zeolites to return them to the top of the bed.

6. The method of circulating zeolites in a water softening system consisting of passing the zeolites by gravity from the high point to a low point in said system and from a low point to the high point again by the force of the kinetic energy of the upwardly flowing water to be softened, while the process of regenerating the zeolites and washing them and withdrawing the used regenerating agent and washing fluid is going on.

7. A water softening apparatus having in combination a part of the structure in which hard water to be softened comes into contact with zeolites, a part in which substantially spent zeolites come into contact with the regenerative agent, a part in which the regenerated zeolites are washed; means for withdrawing used brine and wash water part at a time, and means for circulating said zeolites, from the softening part to the regenerative part, thence to the zeolite washing part by gravity and thence to the softening part again by the kinetic energy of the upwardly flowing water, to be softened.

8. A water softening apparatus adapted to contain and use zeolites, having in combination, means for bringing the hard water into contact with the zeolites, means for reconditioning, part at a time, zeolites whose water softening efficacy has been reduced by use, means for withdrawing used reconditioning agents, and means for returning reconditioned zeolites to the portion of the apparatus where they will again come into contact with the hard water to be treated; said zeolites being repeatedly shifted automatically by gravity from the upper to the lower part of the container and by the kinetic energy of the upwardly flowing water to be softened, from the lower part of the container to the upper part again.

9. The method of constantly maintaining the water softening efficacy of a substantial portion of the zeolites in a water softening apparatus, while said apparatus is in service; consisting of repeatedly withdrawing zeolites from the portion already used for water softening, treating said withdrawn zeolites with a regenerating fluid, washing said regenerated zeolites, withdrawing used regenerating agent and washing fluid and then returning by the kinetic energy of the upwardly flowing water to be softened said thus reconditioned zeolites to the top of the portion of zeolites then in position for softening water.

10. In an apparatus within which the zeolites are repeatedly circulated automatically the combination of a main reaction chamber, a secondary reaction chamber and a washing chamber, through each of which chambers the zeolites fall by gravity, means for withdrawing from said secondary chamber the reaction agent and washing fluid, and a substantially vertical conduit through which the zeolites pass from a lower portion of the washing chamber to the top of the main reaction chamber by the kinetic energy of the upwardly flowing water to be softened.

In testimony whereof, I sign this specification.

CARL H. NORDELL.